United States Patent [19]

Bernshausen

[11] Patent Number: 4,723,440
[45] Date of Patent: Feb. 9, 1988

[54] APPARATUS FOR TEMPORARILY PLUGGING INACCESSIBLE TUBE AND METHOD OF LEAK TESTING UTILIZING THE SAME

[75] Inventor: Mark A. Bernshausen, Brazoria, Tex.

[73] Assignee: Phillips Petroleum Company, Bartlesville, Okla.

[21] Appl. No.: 836,893

[22] Filed: Mar. 6, 1986

[51] Int. Cl.$^4$ .............................................. G01M 3/04
[52] U.S. Cl. ........................................ 73/40; 73/49.8; 138/90
[58] Field of Search ............... 73/40.5 R, 49.1, 49.5, 73/40, 49.8; 138/89, 90; 220/235, 234

[56] References Cited

U.S. PATENT DOCUMENTS

| | | | |
|---|---|---|---|
| 100,456 | 3/1870 | Schutt | 73/49.8 |
| 402,600 | 3/1889 | Kemp | 220/235 |
| 491,184 | 2/1893 | McCartney | 138/89 |
| 922,544 | 5/1909 | Turner et al. | 138/90 |
| 1,226,209 | 5/1917 | Harris | 220/235 |
| 1,558,161 | 10/1925 | Gunderson | 220/235 |
| 1,909,703 | 5/1933 | Moore et al. | 73/49.5 |
| 2,607,370 | 8/1952 | Anderson | 138/90 |
| 3,704,729 | 12/1972 | Tomlinson | 138/90 |
| 4,174,735 | 11/1979 | Visbach | |
| 4,199,975 | 4/1980 | Schrock et al. | 73/40.7 |
| 4,310,029 | 1/1982 | Dudek | 138/89 |
| 4,393,564 | 7/1983 | Martin | 138/89 |
| 4,493,344 | 1/1985 | Mathison et al. | 138/89 |

FOREIGN PATENT DOCUMENTS

| | | | |
|---|---|---|---|
| 577310 | 6/1959 | Canada | 138/89 |
| 366261 | 2/1932 | United Kingdom | 138/89 |
| 373944 | 6/1932 | United Kingdom | 138/89 |
| 2147079 | 5/1985 | United Kingdom | 138/89 |

OTHER PUBLICATIONS

W. L. Nelson, *Petroleum Refinery Engineering*, Fourth Edition, 1958, McGraw Hill, p. 546 FIG. 17-7, "A Floating Head Type of Exchanger".

*Primary Examiner*—Stewart J. Levy
*Assistant Examiner*—Hezron E. Williams
*Attorney, Agent, or Firm*—Paul S. Chirgott

[57] ABSTRACT

A tube plugging device for temporarily plugging a tube having accessible open ends and a method for leak-testing a shell-and-tube type heat exchanger, in which the channel cover is removed from the heat exchanger, while leaving the head cover and shell cover in place, the end of the tube, adjacent the head and shell covers, is plugged by inserting and expanding an elongated plug device having an expandable sealing ring slidably mounted on one end of an elongated rod, a sleeve slidably mounted on the rod to bear against the sealing ring and expand the same and an expanding means threadably mounted on the other end of the rod to bear against the other end of the sleeve and expand the sealing ring, and a fluid under pressure is introduced into the shell-side of the heat exchanger.

5 Claims, 2 Drawing Figures

APPARATUS FOR TEMPORARILY PLUGGING INACCESSIBLE TUBE AND METHOD OF LEAK TESTING UTILIZING THE SAME

The present invention relates to a device for temporarily plugging an inaccessible open end of a tube and a method for utilizing the plugging tool in leak testing a tube. In a more specific aspect the present invention relates to a device for temporarily plugging an inaccessible open end of a tube and a method of leak testing a tube and shell type heat exchanger utilizing the plugging device.

BACKGROUND

In numerous operations it is necessary to temporarily plug an open-ended tube, particularly for leak testing the same, which has an inaccessible end or which end can only be accessed with great difficulty or with the expenditure of substantial amounts of time to disassemble the device containing the tube. This is particularly true when leak testing tube and shell type heat exchangers particularly tube and shell type heat exchangers having at least one floating head. Such heat exchangers are extensively utilized in industry particularly in the petroleum refining industry. Such a heat exchanger is illustrated in FIG. 17-7 at page 546 of "Petroleum Refinery Engineering", W. L. Nelson, 4th Edition, McGraw-Hill, 1958, which illustration is incorporated herein by reference.

Due to the inherent construction of such heat exchangers and the severe conditions to which they are exposed during use, leaks will develop which must be located and repaired. The difficulty of locating such leaks is clearly apparent from FIG. 17-7 of the Nelson reference and FIG. 2 of the drawings of the present application. It is to be seen that the tube bundle is formed by fixedly mounting the tubes in a stationary tube sheet and a floating tube sheet, the latter permitting expansion and contraction of the bundle of tubes. The end having the stationary tube sheet as covered by the channel cover and the end having the floating tube sheet is covered by both a floating head cover and a shell cover. Thus, in order to acess the open end of the tubes it is only necessary to remove the channel cover on one end but it is necessary to remove both the floating head cover and the shell cover on the end having the floating tube sheet. The structure of the device also makes it apparent that, if a leak does develop, it is most likely to develop at one of a multiplicity of potential points in the end having the floating tube sheets. Most likely points of leakage are the lowermost tubes themselves and the floating head, particularly the floating head gasket. Obviously one can not determine, from inspection of the exterior of the exchanger, which of these elements is leaking, whether it is a tube or the head itself. When the leak is observed, it is common practice in the art to remove the shell cover and the floating head to either grease the tube sheet or plug the end of suspected tubes, reinstall the floating head and shell covers and apply pressurized fluid on the shell side of the exchanger. If after this test one is able to distinguish between a leaking head and a leaking tube and determine that a tube is leaking it will once more be necessary to remove the shell cover and the floating head cover and plug the tube suspected of leaking. Unfortunately, one is seldom able to distinguish between a floating head leak and a tube leak on the first test and it is generally necessary to repeat this disassembly and reassembly procedure three to four times in order to arrive a reliable conclusion and remedy the situation. This prior art procedure is quite time consuming irrespective of the skill of the tester.

It would therefore be highly desirable if blind tube ends could be conveniently plugged without major disassembly and uncertainty in the testing of the tube for leaks.

SUMMARY OF THE INVENTION

It is therefore an object of the present invention to provide an improved device for plugging an inaccessible open end of a tube which overcomes the above and other disadvantages of prior art. Another and further object of the present invention is to provide an improved method for leak testing a tube and shell type heat exchanger which overcomes the above and other disadvantages of the prior art. A further object of the present invention is to provide an improved tube plugging means for plugging an inaccessible open end of a tube. Yet another object of the present invention is to provide an improved tube plugging device which can be utilized to plug an inaccessible open end of a tube without the necessity of disassembling the device containing the tube. Another object of the present invention is to provide an improved method for leak testing a tube and shell type heat exchanger. A still further object of the present invention is to provide an improved method for leak testing a tube and shell heat exchanger which readily distinguishes between a tubing leak and a head leak. Yet another object of the present invention is to provide an improved method for leak testing a tube and shell type heat exchanger which requires minimal disassembly. A further object of the present invention is to provide an improved method for leak testing a tube and shell type heat exchanger which substantially reduces the labor and time necessary to locate a leak. These and other objects of the present invention will be apparent from the following description.

An improved device for temporarily plugging an inaccessible open end of a tube includes an elongated rod longer than the tube, having a stop means on one end and a threaded portion on at least the other end, an expandable sealing means, slidably mounted on the first end of the rod adjacent the stop and which is adapted to it expand diametrically when compressed longitudinally, means for expanding the sealing means threadedly mounted on the threaded end of the rod and an elongated sleeve slidably mounted on the rod, having one end which bears against the sealing means and the other end which bears against the expanding means, whereby threadedly moving the expanding means toward the sealing means expands the sealing means by virtue of the pressure applied by the elongated sleeve. A method of leak testing a tube and shell type heat exchanger is also provided in which the channel cover is removed while leaving the shell cover and floating head cover intact, the inaccessible end of at least one tube, suspected of leaking, adjacent the shell and head covers is plugged with the plugging device of the present invention and fluid under pressure is applied to the shell side of the heat exchanger.

BRIEF DESCRIPTION OF THE DRAWINGS

The present invention will be best understood with reference to the accompanying drawings, wherein.

DESCRIPTION OF THE PREFERRED EMBODIMENTS

Figure 1:
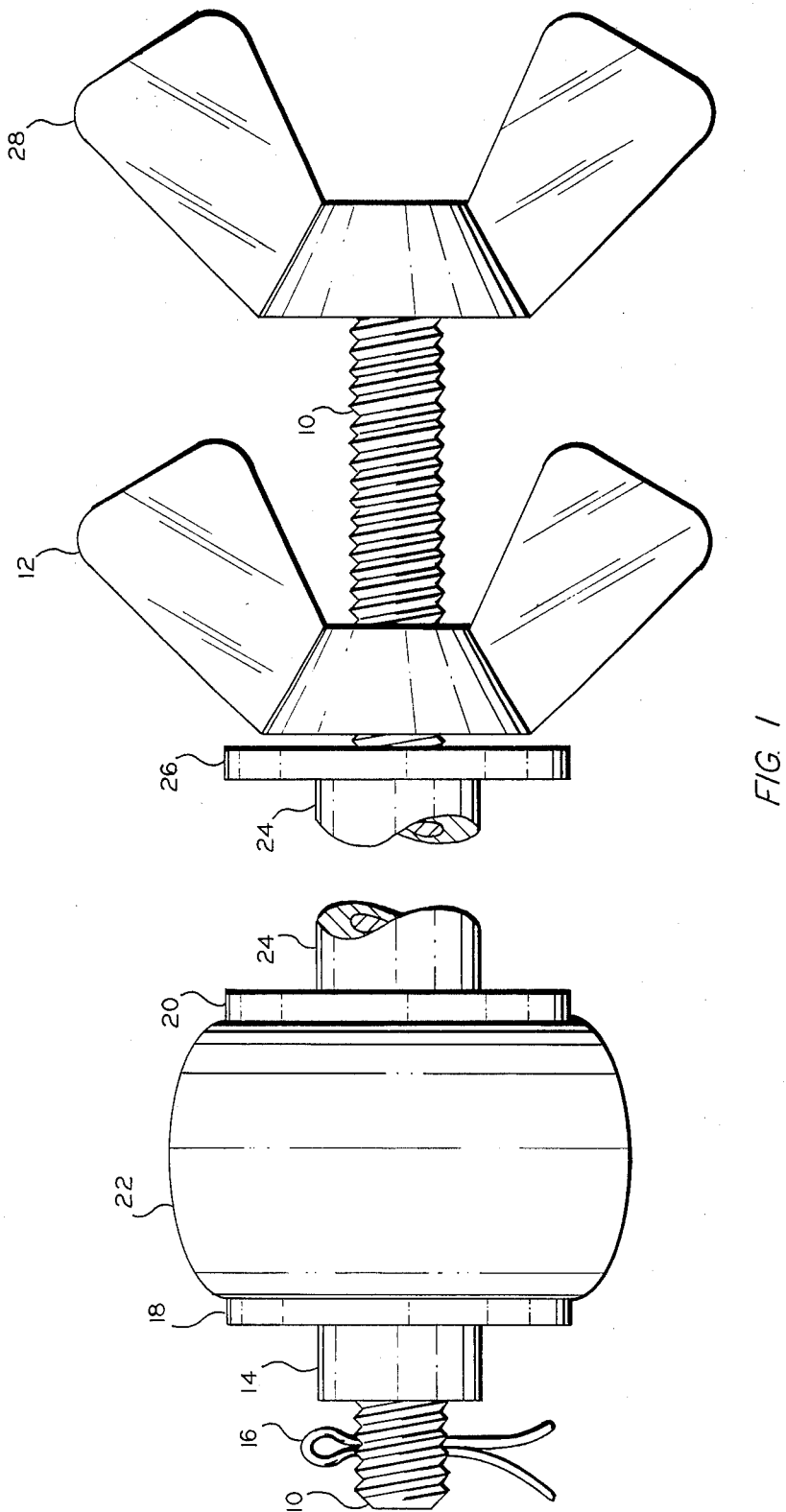
FIG. 1 is a side view, partially in section, of a plugging tool in accordance with the present invention, and, FIG. 2 is a side view, partially in section, of a tube and shell heat exchanger with the plugging tool of the present invention placed therein.

FIG. 1 of the drawings is a side view of a tube plugging or sealing tool in accordance with the present invention. The numeral 10 refers to an elongated rod having at least one end threaded to receive an adjusting nut 12. Because of availability and for convenience in mounting of the elements, rod 10 may be threaded along its entire length as shown. Mounted on a first end of rod 10 is a stationary stop means including a threaded nut 14 which is threaded on the end of rod 10 and a cotter pin 16 which holds nut 14 in a fixed position on the end of the rod 10. Bearing against stationary nut 14 is a collar 18 which may be either fixedly mounted, and therefore form part of the stop means, or slidably mounted on rod 10. Spaced from collar or washer 18 is a second collar 20 which is movably mounted on rod 10. Mounted between collars 18 and 20 is a resilient expandable sealing element 22, which is adapted to the expanded when collar or washer 20 is moved toward collar 18 and to thereby tightly fit within and seal a tube of a heat exchanger or the like. Sealing element 22 may be made of rubber or any other convenient deformable or resilient material.

Slidably mounted on the central portion of rod 20 is tube 24 slidable collar 26 is mounted on the second end of the rod and bears against tube 24. Adjusting means, which in the present case is shown as a wing nut 12, in turn bears against slidable collar or washer 26. Fixedly mounted on the second end of rod 10 is a rod turning means 28, which in the specific case illustrated is simply a fixedly mounted wing nut. Sealing element 22 can therefore be compressed and expanded or reduced in diameter by turning rod 10 by means of rod turning means 28 to thread rod 10 inwardly and outwardly of threadedly movable adjusting means 12 to thereby move collar 20, tube 24 and collar 26 toward and away from the sealing element 22.

Figure 2:
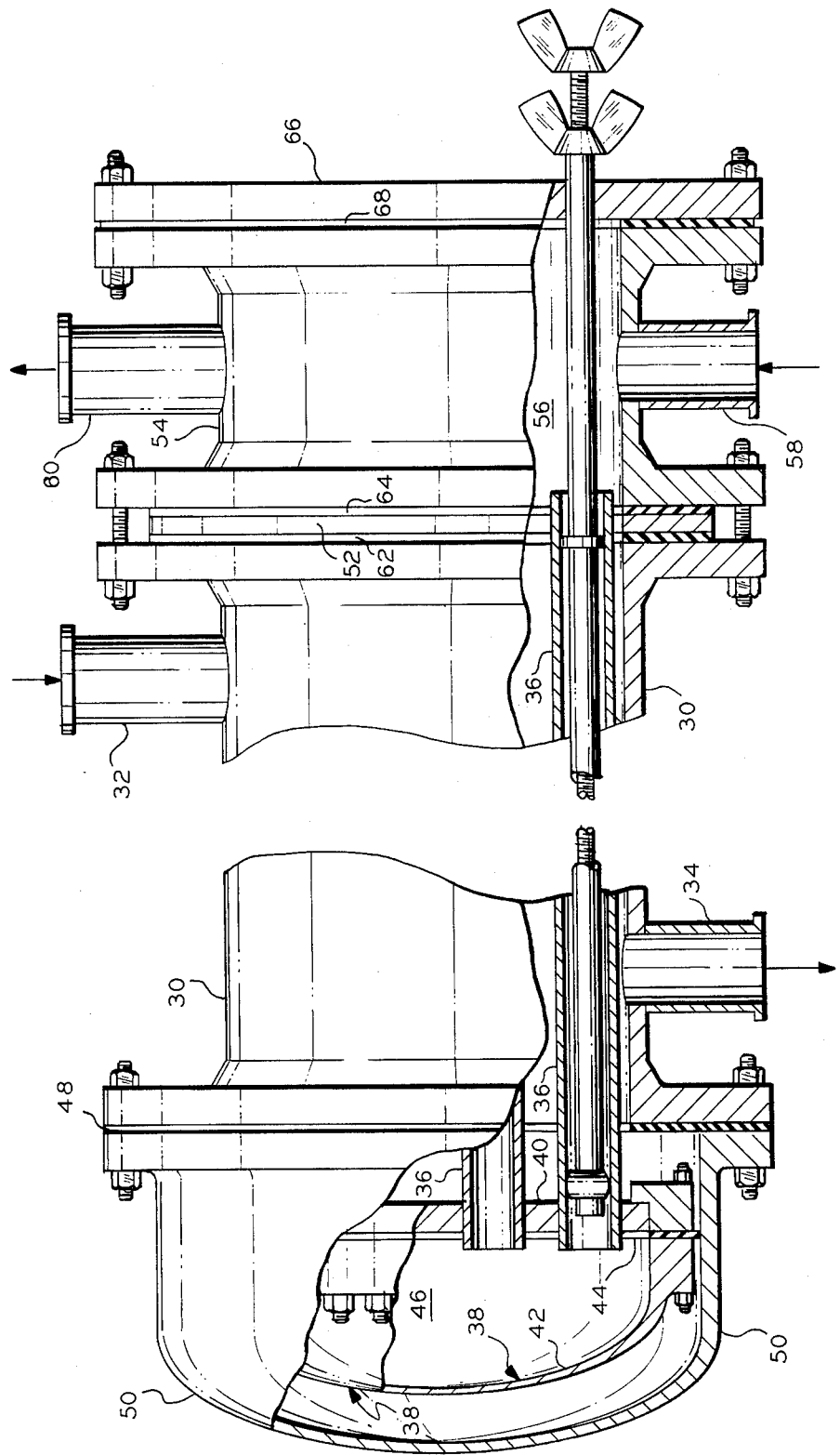

FIG. 2 of drawings is a side view, partially in section, of a floating head, shell and tube heat exchanger showing the plugging or sealing tool of FIG. 1 disposed in one of the tubes of the heat exchanger. In order to clearly show certain of the details, some parts of the heat exchanger of FIG. 2 have been exaggerated in size, for example the size of the tubes and the spacing between the floating head and the shell.

In accordance with FIG. 2, the heat exchanger includes the shell 30, having shell side fluid introduction means 32 and shell side fluid discharge means 34. A bundle comprising a plurality of tubes 36 is mounted within shell 30. Mounted on a first end of the heat exchanger and supporting the first end of the tubes 36 is a floating head 38. Floating head 38 includes a floating tube sheet 40, a floating head cover 42 and a gasket 44, which seals between the periphery of tube sheet 40 and floating head cover 42. Tubes 36 are fixedly mounted in floating tube sheet 40. Floating head cover 42 defines a tube side fluid chamber 46 between the head cover and the tube sheet. Chamber 46 receives fluid from the open ends of of tubes 36. Spaced from and sealably mounted on shell 30, through annular gasket 48, is shell cover 50. As is obvious from the drawing, floating head cover 42 and shell cover 50 are detachably mounted by means of appropriate flanges and bolts. The second end of tubes 36 is fixedly mounted in stationary tube sheet 52. Mounted on the second end of shell 30 is shell extension 54 which defines a second tube side fluid chamber 56 having tube side fluid introduction means 58 and tube side fluid discharge means 60. The stationary tube sheet 52 is clamped between annular gaskets 62 and 64. Closing the second end of the heat exchanger and specifically the end of shell extension 54 is channel cover 66. Channel cover 66 is removably mounted by means of appropriate flanges and bolts and is sealed to shell extension 54 through annular gasket 68. The sealing or plugging tool of FIG. 1 is schematically shown in sealing engagement with the lowermost tube 36.

Further details concerning construction of a floating head type tube and shell heat exchanger are shown and labeled in FIG. 17-7 of Petroleum Refinery Engineering by W. L. Nelson, 4th Edition, 1958, McGraw-Hill at page 546, which is incorporated herein by reference, as well as other appropriate references.

Utilizing the tube plugging or sealing tool of FIG. 1 of the present invention in testing a tube and shell type heat exchanger by the method of the present invention is quite simple. First, the channel cover is removed from the heat exchanger, while leaving the head cover and tube sheet on the opposite end of the shell in place. The plugging or sealing tool of FIG. 1 is then disposed in a tube suspected of leaking and the sealing element expanded to seal the opposite end of the tube. A test fluid such as water is then introduced under pressure into the shell side of the heat exchanger. To the extent this particular tube is leaking such leak will become obvious by test fluid passing through the tube and out the open end of the tube through which the sealing tool was inserted. If the tube in question is not leaking then either another tube or the head cover (usually the head cover gasket) is leaking. The procedure can then be repeated for other tubes, usually a lower tube. If none of the remaining suspected tubes are leaking then it is apparent that the head cover assembly, particularly the head gasket, is leaking. Appropriate repairs, either of the tubes found to be leaking or the head assembly, can be made and the exchanger returned to service. It was found in actual use that use of the sealing tool of the present invention, in accordance with the method of the present invention, resulted in maintenance time savings between two and eight hours per exchanger tested.

While specific materials, conditions of operation, modes of operation and equipment have been referred to herein, it is to be recognized that these and other specific recitals are for illustrative purposes and to set forth the best mode only and are not to be considered limiting.

That which is claimed is:

1. A method of leak-testing at least one tube having an open, inaccessible first end and an open, accessible second end, said tube being located within a shell type heat exchanger, having an elongated shell, a bundle of open-ended spaced tubes longitudinally-disposed in said shell, a head cover removably mounted on a first end of said tube bundle and defining a first fluid receiving cavity, adjacent a first end of said tube bundle, a channel cover spaced from a second end of said tube bundle, removably mounted on a second end of said shell and defining a second fluid receiving cavity, said first and second cavities together with the interior of said tubes forming a tube-side fluid receiving system, and a shell cover spaced from said head cover and removably mounted on a first end of said shell, the interior of said shell and the spaces between said tubes forming a shell-side fluid receiving system comprising:

(a) removing said channel cover while leaving said head cover and said shell cover in place;

(b) inserting an elongated plug means, into at least one tube suspected of leaking, to position said sealing means in said first end of said suspected tube adjacent said head cover wherein said plug means comprises:

i. an elongated rod means, having a length greater than the length of the tube to be plugged, a fixed stop means formed on a first end thereof and being threaded along its entire length;

ii. an expandable sealing means slidably mounted on said first end of said rod adjacent said stop means, adapted to expand diametrically when compressed longitudinally and having a diameter sufficient to fill and seal said tube to be plugged when compressed longitudinally;

iii. nut means threadly mounted on a second end of said rod; and iv. elongated sleeve means slidably mounted on said rod means, having a first end adapted to bear against said nut means, spanning the distance between said sealing means and said nut means and having a second end adapted to bear against said sealing means; whereby threading movement of said nut means toward said sealing means, slides said sleeve means toward said sealing means and longitudinally compresses said sealing means between said stop means and said first end of said sleeve means;

(c) threading said nut means to expand said sealing means and seal said open, inaccessible first end of said suspected tube; and (d) introducing a fluid, at a constant elevated pressure, into said shell-side receiving system, wherein said fluid is in direct contact with the external walls of said tube bundle.

2. A method in accordance with claim 1 wherein detection of the fluid discharging from the suspected tube indicates a leak in said suspected tube and detection of said fluid outside the shell cover or shell indicates a leak in said head cover.

3. A method in accordance with claim 1 wherein detection of the fluid outside said shell cover or said shell indicates a leak in said head cover or a leak in at least one other tube.

4. A method in accordance with claim 3 wherein steps (b) through (d) are repeated for each of at least one of the other suspected tube.

5. A method in accordance with claim 1 wherein said elongated plug means is inserted into said open, accessible second ends of tubes suspected of leaking, and said elongated plug means is adjusted to seal said open, inaccessible first ends of a plurality of said suspected tubes in accordance with steps (b) and (c).

* * * * *